United States Patent [19]

Dieupart

[11] Patent Number: 5,429,763
[45] Date of Patent: Jul. 4, 1995

[54] PROCESS AND PRODUCT FOR REMOVING ICE OR SNOW FROM A TRAFFIC SURFACE

[75] Inventor: Francis Dieupart, Sallanches, France

[73] Assignee: Astreintes Routieres Hivernales (A.R.H.) S.A.R.L., Sallanches, France

[21] Appl. No.: 186,121

[22] Filed: Jan. 25, 1994

[51] Int. Cl.$^6$ ................................. C09K 3/18
[52] U.S. Cl. .......................... 252/70; 106/13
[58] Field of Search ............... 106/13; 252/20

[56] References Cited

U.S. PATENT DOCUMENTS

| | | | |
|---|---|---|---|
| 4,338,359 | 7/1982 | Kestner | 252/70 |
| 5,135,674 | 8/1992 | Kuhajek et al. | 252/70 |
| 5,158,604 | 10/1992 | Morgan et al. | 106/1.24 |

FOREIGN PATENT DOCUMENTS 976077  11/1982  U.S.S.R. ................ 252/70

*Primary Examiner*—Mark L. Bell
*Assistant Examiner*—C. M. Bonner
*Attorney, Agent, or Firm*—Evenson, McKeown, Edwards & Lenahan

[57] ABSTRACT

According to the invention, a melting composition based on alkali chloride and water is spread on the traffic surface, the melting composition being a mixture containing a small proportion of an additive which increases the thixotropic properties of the mixture without substantially modifying its melting properties. The additive is, for example, hydrophilic pyrogenated colloidal silica, or a hydrated aluminum and/or magnesium silicate, in powder form, of the bentonite or montmorillonite type. The viscosity of the melting composition is thereby increased and simultaneously the speed of evacuation is decreased. The process finds application in the maintenance of pavements during winter.

7 Claims, No Drawings

PROCESS AND PRODUCT FOR REMOVING ICE OR SNOW FROM A TRAFFIC SURFACE

BACKGROUND OF INVENTION

1. Field of the Invention

The present invention concerns processes and products enabling the removal of ice or snow from a traffic surface such as a pavement or a sidewalk.

2. Description of Prior Art

In known processes and products, a melting composition based on an alkali chloride and water, for example, a calcium chloride or a sodium chloride, is spread on the traffic surface.

It is known that diluted melting compositions, when they are applied on different types of traffic surfaces, have a tendency to be evacuated by running, depending on the slope or the camber of the surface, by projection due to the passing vehicles, or by penetration due to the porosity of the coated draining materials.

In a critical period, the traffic surfaces should be constantly under surveillance, to ensure the continuous presence of a sufficient quantity of melting composition on the traffic surface. This leads to the spreading of melting compositions according to a frequency which is adapted to the climatic and circulation conditions.

Following the penetration or running down, the melting compositions run away from the traffic surface, and penetrate in the phreatic layers. The result is a non-negligible pollution, which is capable of modifying the natural equilibrium of the environment.

The problem proposed by the present invention is to reduce the quantities of melting compositions which are required to ensure the removal of ice or snow on traffic surfaces, and to space the spreadings which are required for the maintenance of these traffic surfaces.

The invention results from the observation according to which the diluted melting compositions which are used on traffic surfaces have a low viscosity, which is conducive to a high speed of evacuation of the melting composition. Thus, the invention proposes to increase the viscosity of the melting compositions, without, however, disturbing their melting properties, and without substantially increasing sliding risks or adhesion defects of the vehicles on the traffic surfaces which is coated with such a melting composition.

According to the invention, an advantageous compromise should be found between the necessary increase of the viscosity and the disadvantages which could possibly result therefrom, which relate to a defect of adhesion, or relate to the production cost of the products.

SUMMARY OF INVENTION

To achieve the above and other objects, the process according to the invention for removing ice or snow from a traffic surface utilizes the spreading of a melting composition based on alkali chloride and water on the traffic surface, the melting composition being a mixture containing a low proportion of an additive which increases the thixotropic properties of the mixture without substantially modifying its melting properties.

The additives used are in the form of very fine powder, for example, they are based on hydrophilic pyrogenated colloidal silica, or on a hydrated aluminum and/or magnesium silicate of the bentonite or montmorillonite type.

According to another aspect of the invention, a product for removing ice or snow from a traffic surface contains a melting composition based on an alkali chloride and water, and in addition, a small proportion of an additive which increases the thixotropic properties of the product without substantially modifying its melting properties.

The invention will now be described more in detail in relation to various embodiments of the process and the product for removing ice or snow from a traffic surface.

As in known processes, the process according to the invention for removing ice or snow from a traffic surface consists in spreading a melting composition based on alkali chloride and water, preferably based on sodium chloride and water.

The melting composition may advantageously be a brine containing about 23% by weight of sodium chloride in water, with the possible addition of a solid salt when spreading to provide a slurry.

In such a brine, an additive is added to increase the thixotropic properties of the mixture without substantially modifying its melting properties.

According to an embodiment, the additive consists of hydrophilic pyrogenated colloidal silica, preferably of a type whose specific surface is between 150 and 250 m$^2$ per gram.

According to another embodiment, the additive is a hydrated aluminum and/or magnesium silicate in powder form. Thus, a bentonite or a montmorillonite may be used.

Bentonite or montmorillonite may be associated with a polar additive such as methyl alcohol, ethyl alcohol or acetone, to provide gelling properties in water.

In all the embodiments, the additive is present in the brine in a quantity preferably between 0.5 and 2% by weight of the mixture which is spread on the traffic surface.

According to such a process, during spreading, the proportion of additive in the brine may be modulated, to increase its proportion in the inclined traffic zones. The aim is to control the running and evacuation speed of the melting composition, so that this speed may be substantially constant along a given portion of the traffic surface, when this portion comprises highly inclined and less inclined zones.

The addition of the additive in the melting composition may be made at various stages of the process. For example, it is possible to incorporate the additive already at the initial stage of preparation of the melting composition. As an alternative, the additive may be incorporated during spreading. Another possibility consists in preparing a master mixture with a high proportion of additive in a brine, then adding an appropriate quantity of brine to the master mixture before spreading. This added quantity may be modulated depending on the climatic or circulation conditions.

The product according to the invention for removing ice or snow from a traffic surface contains a melting composition based on alkali chloride and water, and additionally contains a small proportion of an additive which increases the thixotropic properties of the product without substantially modifying its melting properties.

In the product according to the invention, the additive may contain hydrophilic pyrogenated colloidal silica, or bentonite, or montmorillonite, possibly modified by a polar additive such as methyl alcohol, ethyl alcohol or acetone.

The product may be at a suitable concentration to be directly spread on the traffic surface, for example, a brine containing 23% sodium chloride and an additive which is present in an amount between 0.5 and 2% by weight of the mixture.

As an alternative, the product may be in the form of a master mixture with a high concentration of additives, for example, up to 10% by weight of the mixture, in a brine at a concentration substantially equal to the final desired concentration for spreading on the traffic surface. For example, the brine may be at a concentration of 23% sodium chloride in water: it is thereafter merely sufficient to mix the master mixture with a quantity of brine of the same concentration.

The presence of the additive does not substantially modify the melting properties of the mixture. The use of the product according to the invention is thus largely facilitated, since it does not modify the habits and the usual knowledge of the person in charge of the maintenance of traffic surfaces.

The only effect observed is an increase of the time of evacuation of the melting composition on the traffic surface, which enables a decrease of the frequencies of spreading, and a decrease of the quantities of melting composition required for maintenance of a traffic surface under the same given period.

Also, it is possible to observe that the presence of additives according to the invention does not significantly increase the risk of sliding or adhesion defect of vehicles on a pavement containing the mixture of melting composition and additive according to the invention.

Although embodiments have been described mainly in relation to a brine based on sodium chloride, calcium chloride may also be used when it is appropriate.

The incorporation of an additive in the melting composition may be carried out by any known mechanical means, such as wing stirrers, solubilizers, tricylinders, normally used to incorporate a powder into a liquid.

The incorporation of the additive may, however, be complicated, since appropriate proportions should be respected. For this purpose, the method consisting of preparing a master mixture having a high proportion of an additive would be preferred, since it is thereafter only sufficient to mix the master mixture and a traditional brine, which does not require specific material nor qualified personnel.

The present invention is not limited to the embodiments which have been explicitly described, but it includes various variants and generalizations contained within the appended claims.

I claim:

1. Process for removing ice or snow from a traffic surface, in which a melting composition comprising an alkali chloride and water is spread on the traffic surface, wherein the melting composition further comprises an additive consisting of hydrophilic pyrogenated colloidal silica which increases thixotropic properties of the composition without substantially modifying its melting properties.

2. Process according to claim 1, wherein the hydrophilic pyrogenated colloidal silica is of a type whose specific surface is between about 150 and 250 $m^2$ per gram.

3. Process for removing ice or snow from a traffic surface, in which a melting composition comprising alkali chloride and water is spread on the traffic surface, wherein the melting composition further comprises an additive which increases thixotropic properties of the composition without substantially modifying its melting properties, and said additive comprises a hydrated aluminum or magnesium silicate in powder form and a polar agent which provides gelling properties in water.

4. Process according to claim 3, wherein said polar agent which provides gelling properties in water is methyl alcohol, ethyl alcohol or acetone.

5. Process for removing ice or snow from a traffic surface, in which a melting composition comprising alkali chloride and water is spread on the traffic surface, wherein the melting composition comprises a brine containing about 23% by weight of sodium chloride in water and an additive which increases thixotropic properties of the composition without substantially modifying its melting properties, said process further comprising the additional step of adding solid sodium chloride when spreading to produce a slurry.

6. Process according to claim 5, wherein the additive is present in the brine in a quantity between 0.5 and 2% by weight.

7. Process according to claim 6, wherein during spreading, a proportion of the additive in the brine is increased when the composition is applied to inclined surfaces.

* * * * *